US008340612B2

(12) United States Patent
Schlee

(10) Patent No.: US 8,340,612 B2
(45) Date of Patent: Dec. 25, 2012

(54) ACTIVE ANTENNA ARRAY AND METHOD FOR CALIBRATION OF THE ACTIVE ANTENNA ARRAY

(75) Inventor: Johannes Schlee, Ulm (DE)

(73) Assignee: Ubidyne, Inc., Wilmington, DE (US)

( * ) Notice: Subject to any disclaimer, the term of this patent is extended or adjusted under 35 U.S.C. 154(b) by 262 days.

(21) Appl. No.: 12/751,342

(22) Filed: Mar. 31, 2010

(65) Prior Publication Data

US 2011/0244819 A1 Oct. 6, 2011

(51) Int. Cl.
*H04B 17/00* (2006.01)

(52) U.S. Cl. .................... 455/226.1; 455/67.11; 455/68; 342/368

(58) Field of Classification Search ............... 455/226.1, 455/67.11, 68, 63.1, 67.13, 562.1, 115.1, 455/130–132, 191.3, 226.2, 226.3, 230, 245.2, 455/277.1, 280, 69; 342/165–175, 195, 368, 342/384
See application file for complete search history.

(56) References Cited

U.S. PATENT DOCUMENTS 6,480,153 B1 * 11/2002 Jung et al. .................... 342/368
6,693,588 B1 * 2/2004 Schlee .......................... 342/368
7,102,569 B2 * 9/2006 Tan et al. ...................... 342/368
7,106,249 B2 * 9/2006 Kubo et al. ................... 342/174
7,205,936 B2 * 4/2007 Park et al. .................... 342/368
7,292,877 B2 * 11/2007 Yoon et al. ................. 455/562.1
7,467,083 B2 12/2008 Kondo et al.
8,009,095 B2 * 8/2011 Schlee et al. .................. 342/368
8,154,452 B2 * 4/2012 Webb ............................ 342/368
8,184,606 B2 * 5/2012 Bang et al. .................... 370/339
2004/0063469 A1 4/2004 Kuwahara et al.
2004/0088610 A1 * 5/2004 Kobayakawa ................ 714/701
2004/0142729 A1 * 7/2004 Yuda et al. ................. 455/562.1
2005/0140546 A1 6/2005 Park et al.
2005/0220310 A1 10/2005 McGrath
2006/0019712 A1 1/2006 Choi
2006/0135111 A1 6/2006 Jensen
2006/0141955 A1 6/2006 Karjalainen et al.
2006/0183504 A1 8/2006 Tanaka et al.
(Continued)

FOREIGN PATENT DOCUMENTS

EP 938204 8/1999
(Continued)

OTHER PUBLICATIONS

International Search Report& Written Opinion issued in PCT/EP2001/054923 on Jun. 7, 2011.

(Continued)

*Primary Examiner* — Pablo Tran
(74) *Attorney, Agent, or Firm* — Stephen H. Eland; Dann, Dorfman, Herrell & Skillman

(57) ABSTRACT

The disclosure relates to an active antenna array for a mobile communication system which comprises a plurality of receive paths, a control unit for generating a sounding signal, and a coupler for coupling the sounding signal into at least one of a plurality of receive paths. A switch is used to switch the output of one the plurality of receive paths between one of a receiver and a calibration unit. The disclosure also provides a method for the calibration of the active antenna array which comprises generating an initial sounding signal, coupling the initial sounding signal into at least one of a plurality of receive paths to generate an adjusted sounding signal, comparing the adjusted sounding signal with an initial sounding signal and then generating calibration parameters.

6 Claims, 3 Drawing Sheets

U.S. PATENT DOCUMENTS

2009/0291632 A1 11/2009 Braithwaite et al.

FOREIGN PATENT DOCUMENTS

| | | |
|---|---|---|
| EP | 1085684 | 3/2001 |
| EP | 1178562 | 2/2002 |
| EP | 1187354 | 3/2002 |
| EP | 1615291 | 1/2006 |
| EP | 1329983 | 10/2006 |
| EP | 1585231 | 10/2009 |
| EP | 1608082 | 8/2010 |
| EP | 1906554 | 10/2010 |
| WO | 95/34103 | 12/1995 |
| WO | 03/028248 | 4/2003 |
| WO | 2009060598 | 5/2009 |

OTHER PUBLICATIONS

Extended European Search Report for EP Appl. No. 11160335.3 issued on Apr. 19, 2012.

International Preliminary Report issued in PCT/EP11/54923 on Oct. 2, 2012.

* cited by examiner

ACTIVE ANTENNA ARRAY AND METHOD FOR CALIBRATION OF THE ACTIVE ANTENNA ARRAY

CROSS-REFERENCE TO RELATED APPLICATIONS

This application is related to U.S. Patent Application No. 12/751,368 entitled: "ACTIVE ANTENNA ARRAY AND METHOD FOR CALIBRATION OF THE ACTIVE ANTENNA ARRAY", filed Mar. 31, 2010 and U.S. Patent Application No. 12/751,391 entitled "ACTIVE ANTENNA ARRAY AND METHOD FOR CALIBRATION OF RECEIVE PATH IN SAID ARRAY", filed Mar. 31, 2010.

FIELD OF THE INVENTION

The field of the invention relates to an active antenna array and a method for calibration of the active antenna array.

BACKGROUND OF THE INVENTION

The use of mobile communications networks has increased over the last decade. Operators of the mobile communications networks have increased the number of base stations in order to meet an increased demand for service by users of the mobile communications networks. The operators of the mobile communications network wish to reduce the running costs of the base station. One option to do this is to implement a radio system as an antenna-embedded radio forming an active antenna array. Many of the components of the antenna-embedded radio may be implemented on one or more chips.

Multiple receive paths in the antenna-embedded radio need to be synchronised in phase, delay and amplitude of signals travelling on the receive paths. Known techniques to establish variations in the phase, delay and amplitude of signals involve the injection of a known signal, termed the sounding signal, into one or more of the receive paths and, based on the comparison of the sounding signal and the received signal, the phase, delay and amplitude variations for the signals in the receive paths can be estimated. This allows for calibration of the receive paths by generation of correction coefficients to be applied to receive signals received along the multiple receive paths.

The sounding signal can have either the same frequency in a carrier signal spectrum or beat a different frequency than the carrier signal spectrum. In the first case (frequency of the sounding signal is in the carrier signal spectrum) than it is necessary to correctly adjust power of the sounding signal. If the power of the sounding signal is too high, than the quality of the carrier signal can be degraded. On the other hand, if the power of the sounding signal is too low, the quality of the measurements of the phase, delay and amplitude variations is too low.

If the sounding signal is positioned in a frequency spectrum different from the carrier signal spectrum, then frequency and phase response of the analogue receive filters in the receive paths can be slightly different at the different frequencies. This implies that the measurement results for the phase, delay and amplitude of the signals measured at the frequency of the sounding signal may be slightly different than the measurement results for the phase, delay and amplitude of the signals measured at the frequency of the carrier signal. In addition, it is necessary to ensure that the frequency of the sounding signal is different than any of the frequencies of the other carrier signals which might be measured at the antenna embedded radio. There is also a risk that blockers in the antenna embedded radio may block certain frequency bands and thus affect the quality of the error measurement. Finally the sounding signal might be unintentionally transmitted from a receive antenna and then be detectable at a receive port of another (unconnected) receiver, which might violate regulations.

A further known solution is to use a wide-band spectrum, for example a spread spectrum, sounding signal which is close to or below the noise floor of the carrier signals. In order to avoid the blockers, an extremely long sounding signal spreading code is necessary in order to have sufficient processing gain.

SUMMARY OF THE INVENTION

The active antenna array of this disclosure comprises a plurality of receive paths, a control unit for generating a sounding signal, and a coupler for coupling the sounding signal into at least one of the plurality of receive paths. At least one switch is located in one of the plurality of receive paths for switching the one of the plurality of receive paths between one of a receiver and a calibration unit. This switch allows the sounding signal to be passed to each one of the receive paths to enable the receive paths to be separately calibrated.

In one aspect of the disclosure, the active antenna array comprises a power meter for monitoring the average power of receive signals on at least one of the plurality of receive paths. This allows the power of the sounding signal to be kept at a level which does not interfere with the receive signals. The active antenna array may also include a power control for generating a power offset signal and adding the power offset signal to the sounding signal.

The disclosure also teaches a method for calibration of an active antenna array which comprises generating an initial sounding signal, coupling the initial sounding signal into at least one of a plurality of receive paths to generate an adjusted sounding signal and comparing the adjusted sounding signal with the initial sounding signal, thus generating correlation coefficients. The correlation coefficients can be applied to the receive signals in a digital signal processor to correct of variations in phase, amplitude and delay along the various receive paths.

The method may also comprise measuring power of receive signals over at least one of the plurality of receive paths and adding an offset power signal to the initial sounding signal.

The comparing of the adjusted sounding signal with the initial sounding signal comprises storing of the initial values of the initial sounding signals and the storing of the adjusted values of the adjusted sounding signals and comparing the initial values with the adjusted values.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
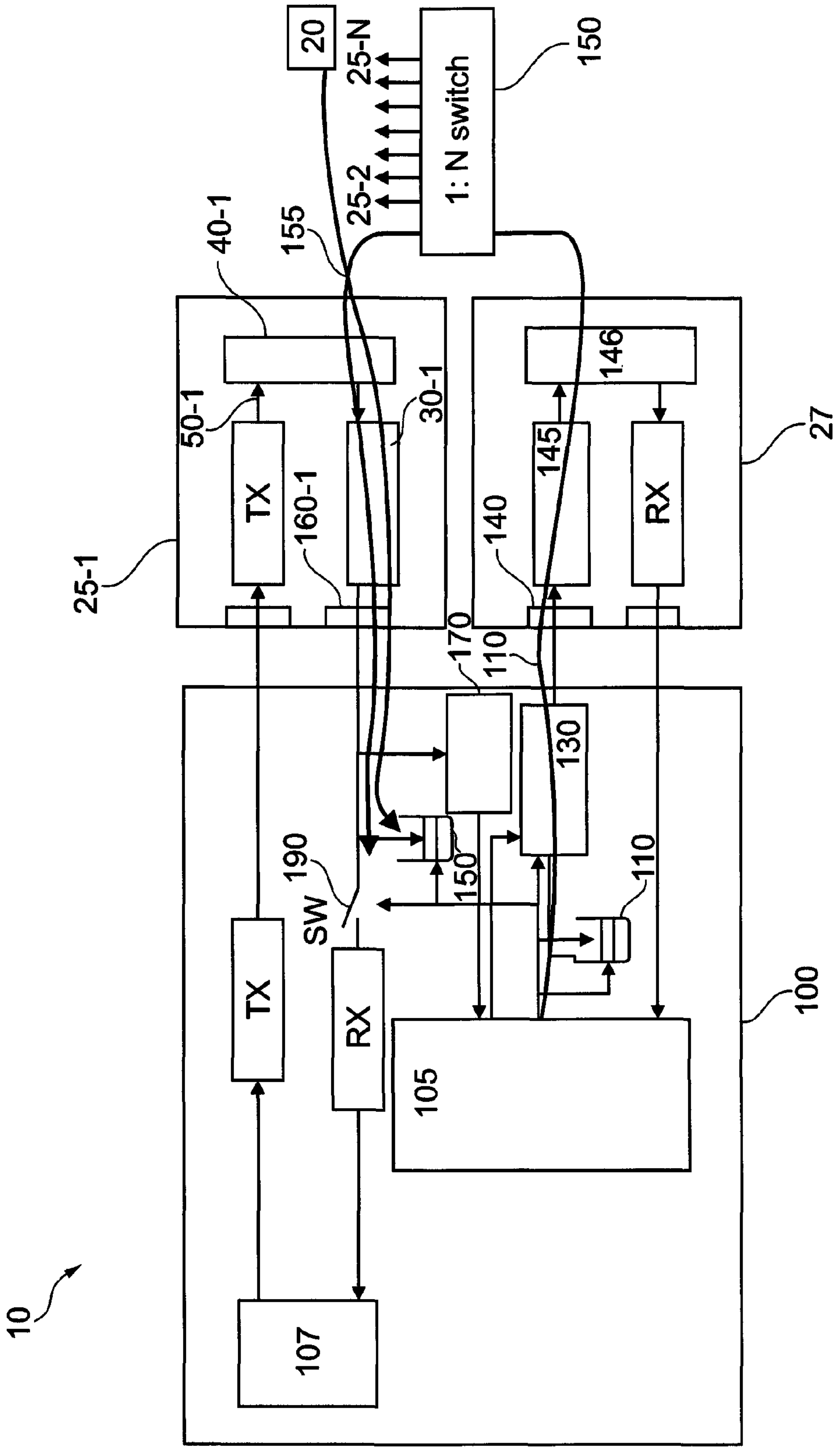
FIG. 1 shows an example of an active antenna array using the system for the calibration of a single signal receive path.

FIG. 1 shows an example of an aspect of the invention—in this instance—for the calibration of a single receive path 30-1 in an active antenna array 10 by the generation of correction coefficients. The active antenna array 10 has a plurality of antenna elements 20 (only one of which 20-1 is shown in FIG. 1) which are connected to a plurality of transceivers 25. In the aspect shown in FIG. 1 only one of the transceivers 25 is shown and is labelled as 25-1. It will be appreciated that the teachings of this disclosure are relevant for an active antenna array 10 with any number of transceivers 25. Typically there will be eight or sixteen transceivers 25.

The transceiver 25-1 has a receive path 30-1 and a transmission path 50-1. Both the receive path 30-1 and the transmission path 50-1 are connected to the antenna element 20 through a switch 40-1. The function of the switch 40-1 is to switch the antenna element 20 between transmit signals being transmitted on the transmission path 50-1 and receive signals being received from the antenna element 20 and passed to the receive path 30-1.

The active antenna array 10 has a digital signal processor 100. The digital signal processor 100 is used to produce the transmit signals for transmission on the antenna elements 20 and to process the receive signals received from the antenna element 20. A beamforming block 107 in the digital signal processor 100 will use correction coefficients calculated as described later in this disclosure in order to account for phase, delay and amplitude variations on the receive signals received on the receive path 30-1. This function has been described in co-pending applications of Ubidyne and will be not discussed here in detail.

The active antenna array 10 has further a control unit 105 whose function is to produce a sounding signal 110. The control unit 105 is connected to a first FIFO memory 120 and to a power controller 130. The power controller 130 is connected to an auxiliary transceiver 27. The sounding signal 110 is received from the power controller 130 and is converted by a digital-analogue-controller (DAC) 140 to an analogue signal and is passed along an auxiliary transmission path 145 to an output 146 and than to a multi-way switch 150. It will be noted at this stage that the auxiliary transceiver 27 also includes a receive path, but this is not used in this aspect of the invention.

The multi-way switch 150 accepts the sounding signal 110 as an input and switches the sounding signal 110 to one of the plurality of the transceivers 25-1, 25-2, . . . , 25-N. In the aspect depicted in FIG. 1 the sounding signal 110 is passed through a coupler 155 to the duplex filter 40-1 of the first one 25-1 of the transceivers 25.

It will be noted that the multi-way switch 150 has a number of other outputs which are labelled in the Figure as being passed to other ones of the plurality of the transceivers 25-2, . . . , 25-N.

In the first transceiver 25-1 the sounding signal 110 is passed to the receive path 30-1 and than to an analogue-digital-convertor 160-1. The sounding signal 110 (now in digital form) is passed further to the digital signal processor 100 for processing or to a second FIFO memory 180. A power meter 170 measures the power on the receive path 30-1 in the digital domain and passes the result of the power measurement to the control unit 105. The switch 190 is controlled by a signal from the control unit 105.

Both the first FIFO memory 120 and the second FIFO memory 180 are connected to the control unit 105 processor 100 and the results can be compared with each other, as will be discussed below, in order to calibrate correction values for the signals received along the receive path 25-1. The first FIFO memory 120 and the second FIFO memory 180 together with the control unit 105 collectively form a calibration unit.

Figure 2:
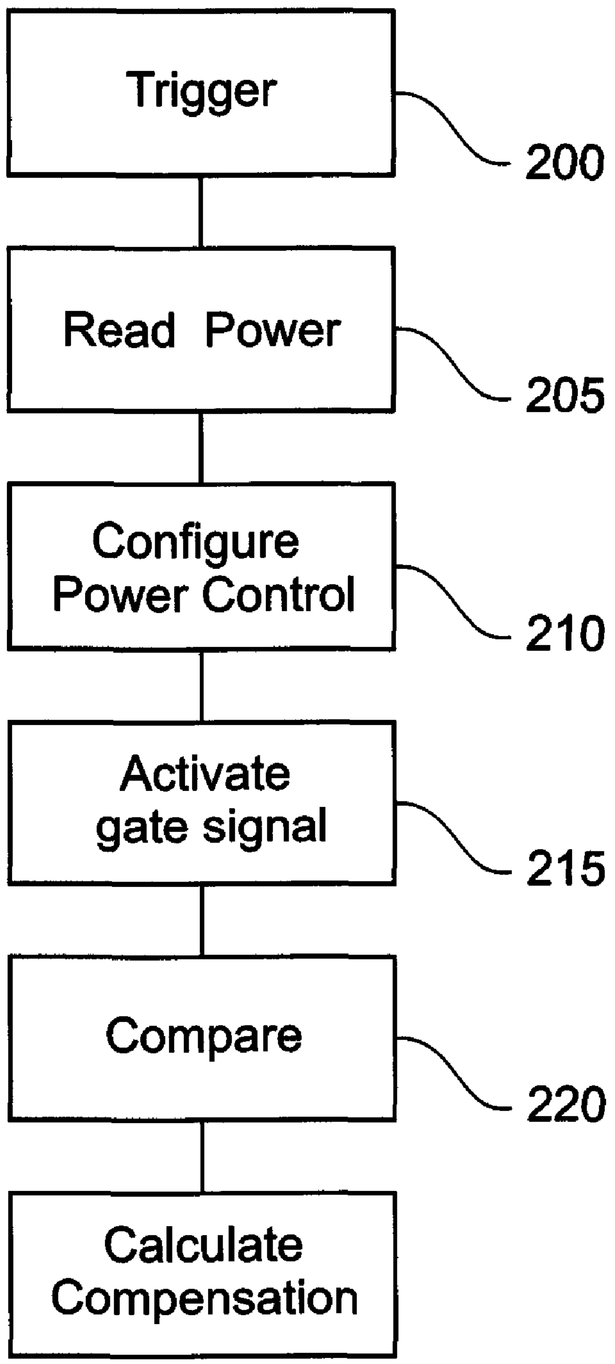
FIG. 2 shows an overview of the method used for the calibration of the single receive path.

FIG. 2 shows a method which is used for the measurement and thus calculation of the compensation values for the phase, delay and amplitude of the signals received along the receive path 25-1. In a first step 200 the control unit 105 receives a trigger signal to indicate that a measurement needs to be started.

In step 205 the control unit 105 reads the power Prx of the receive signals on the receive path 30-1 by means of the power meter 170. The control unit 105 uses this power measurement Prx to configure the power control 130 to send the sounding signal 110 with a power of Prx plus an offset power Pd. The offset power Pd is an offset amount which is used to optimise the power of the sounding signal 110 for the active antenna array 10 being used. It will be noted at this time that only the power control 130 has been configured. No sounding signal 110 is yet sent.

In step 215 a gate signal is sent from the control unit 105 which activates the calculation procedure. The power control 130 sends the sounding signal 110 with the specified power Prx+Pd through the auxiliary transceiver 27 and the multi-way switch 150 to the required one of the transceivers 25 which is to be calibrated. It was noted above that the aspect shown in FIG. 1 is of the transceiver 25-1. It will be further noted that the multi-way switch 150 can switch the sounding signal 110 to any one of the other transceivers 25-2, . . . , 25-B and will generally do this in a round-robin-manner so that in the course of time all of the transceivers 25-1, 25-2, . . . , 25-N will be calibrated using the teachings of this disclosure.

The switch 190 is open and thus the receive signals on the receive paths 30 are not passed through to the digital signal processor 100 but instead the values are collected by the second FIFO memory 180. The reason for the open switch 190 is to ensure that no distortions of the receive signals are passed through to the digital signal processor 100 during collections in the second FIFO memory 180. The first FIFO memory 120 will have obtained the values of the sounding signal 110 before the sounding signal 110 was passed through the auxiliary transceiver 27.

In step 220 the gate signal is deactivated and the switch 190 is closed to allow the receive signals to pass normally to the digital signal processor 100. The values in the first FIFO memory 120 and the second FIFO memory 180 are read out and compared with each other in step 230 in order to calculate the changes in the phase, delay and amplitude of the sounding signal passing through the receive path 30-1 of the transceiver 25. This corresponds to variations in the phase, delay and amplitude of the receive signals which pass along the receive path 30-1. This allows the correction coefficients to be calculated which can be used to adjust the values of the phase, frequency and amplitude of the receive signals of the carrier signals received from the antenna element 20.

Figure 3:
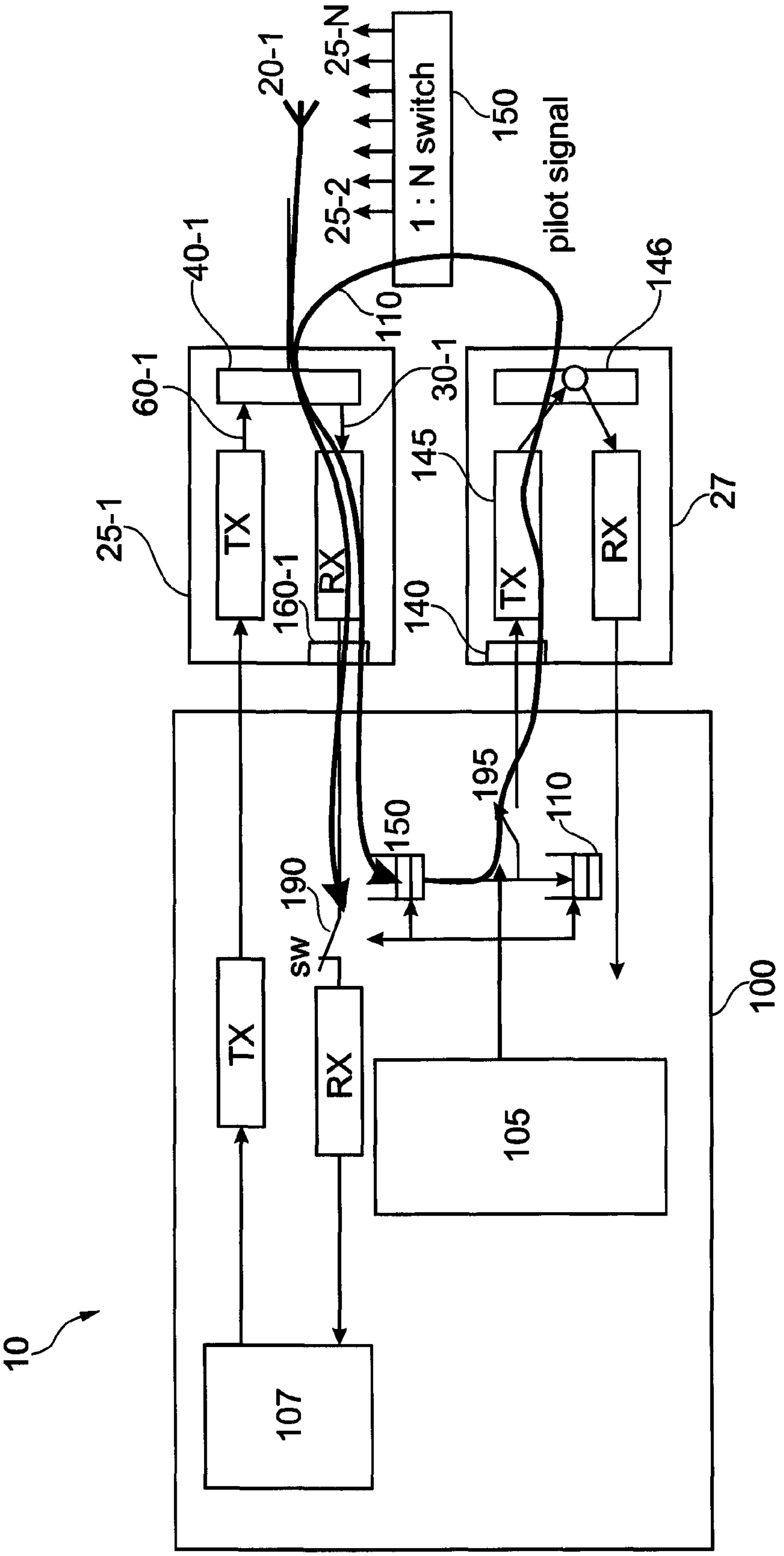
FIG. 3 shows another aspect of the active antenna array.

FIG. 3 shows a further aspect of the invention in which the generation of the sounding signal 110 by the control unit 105 is replaced by the extraction of part of the receive signals received on the receive part in order to generate the sounding signal. This is done by passing the stored values in the second FIFO 150 through a second switch 195 to the auxiliary transceiver 27 as the sounding signal 110. The stored values from the second FIFO 150 are also passed to the first FIFO 110 so that the sounding signal 110 passed to the auxiliary transceiver can be compared with the sounding signal received after passage through the receive path 30-1.

This aspect of the invention reduces the hardware required since there is no need to have a separate circuit to generate a separate sounding signal. Furthermore there is no need to adjust the power of the sounding signal 110 as the strength of the sounding signal 110 generated from the values in the second FIFO 150 are approximately the same as those of the receive signal.

The control unit 105 is used to activate the calibration procedure. It does this by closing the second switch 195 so that values from the second FIFO 150 are passed to the auxiliary transceiver 27 and opening the first switch 190 so that none of the sounding signal 110 is passed through to the digital signal processor 100. The receive signal is captured in the second FIFO 150 and, after a short delay, passed through the transmission path of the auxiliary transceiver 27 to the multi-way switch 150. The values received in the second FIFO 150 are compared to the transmitted values stored in the first FIFO 110 to calculate the correction coefficients.

It will be noted that the calculation of the correction coefficients should be carried out in a carrier-based manner because there could be differences in the power of the receive signals from two different ones of the carrier signals. Therefore the power meter 170 should be measuring the power of the required carrier signal, i.e. at the carrier signal frequency. It will, of course, be noted that should more than one carrier's receive signals be received by the antenna element 20 it could be possible to include more than one power meter 170 in order to measure the power of the carrier signals of the different carriers at different frequencies. The inclusion of more than one power meter 170 enables the calculation of the correction coefficients to be carried out for more than one carrier signal at the same time. This minimises the impact of the time required for the calculation of the correction coefficients for the received carrier signals and also the impact of the calibration of the receive signals.

It will be appreciated that in the event that the power of the received carrier signals is significantly changed during the calculation of the correction coefficients then the measurement may be corrupted. It would be possible for a trigger to be placed within, for example the control unit 105, that triggers the calculation procedure only when there is a low probability of a significant change in the power of the received carrier signal.

In further refinements of this disclosure it will be appreciated that the sounding signal, its timing and its power can be selected such that any distortions due to the sounding signal in the receive signal are minimised. For example, when calibrating GSM signals it would be possible to choose a certain time slot for the calculation procedure. Similarly for the calculation of correction coefficients for LTE receive signals a certain specified time and frequency slot should be used. A spreading code that is not in use and is not intended to be used could be used for the generation of the sounding signal and the calculation of correction coefficients for WCDMA signals. Similarly a certain time slot and spreading code could be used for the generation of the sounding signal and the calculation of correction coefficients for TD-SCDMA signals. Of course, the skilled person will understand that with other types of radio signals there are opportunities for selecting the correct timing and power of the sounding signal as well as its structure.

While various embodiments of the present invention have been described above, it should be understood that they have been presented by way of example, and not limitation. It will be apparent to persons skilled in the relevant arts that various changes in form and detail can be made therein without departing from the scope of the invention. In addition to using hardware (e.g., within or coupled to a central processing unit ("CPU"), micro processor, micro controller, digital signal processor, processor core, system on chip ("SOC") or any other device), implementations may also be embodied in software (e.g. computer readable code, program code, and/or instructions disposed in any form, such as source, object or machine language) disposed for example in a computer useable (e.g. readable) medium configured to store the software. Such software can enable, for example, the function, fabrication, modelling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known computer useable medium such as semiconductor, magnetic disc, or optical disc (e.g., CD-ROM, DVD-ROM, etc.). The software can also be disposed as a computer data signal embodied in a computer useable (e.g. readable) transmission medium (e.g., carrier wave or any other medium including digital, optical, analogue-based medium). Embodiments of the present invention may include methods of providing the apparatus described herein by providing software describing the apparatus and subsequently transmitting the software as a computer data signal over a communication network including the internet and intranets.

It is understood that the apparatus and method described herein may be included in a semiconductor intellectual property core, such as a micro processor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. An active antenna array for a mobile communications network comprising:

a plurality of receive paths;

a control unit for generating a sounding signal;

a coupler for coupling the sounding signal into at least one of the plurality of receive paths;

at least one switch in one of the plurality of receive paths for switching the one of the plurality of receive paths between one of a receiver and a calibration unit.

2. The active antenna array of claim 1, further comprising:

a power meter for monitoring the average power of receive signals on at least one of the plurality of receive paths.

3. The active antenna array of claim 2, further comprising a power control for generating a power offset signal and adding the power offset signal to the sounding signal.

4. The active antenna array of claim 1, further comprising a multi-way switch for switching the sounding signal between different ones of the plurality of receive paths.

5. The active antenna array of claim 1, wherein the control unit generates the sounding signal from a portion of a signal on one of the plurality of receive paths.

6. A computer program product comprising a non-transitory computer usable medium having control logic stored therein for causing a computer to manufacture an active antenna array for a mobile communications network comprising:

a plurality of receive paths;

a control unit for generating a sounding signal;

a coupler for coupling the sounding signal into at least one of the plurality of receive paths;

at least one switch in one of the plurality of receive paths for switching the one of the plurality of receive paths between one of a receiver and a calibration unit.

* * * * *